(12) United States Patent
Smith et al.

(10) Patent No.: US 10,979,141 B1
(45) Date of Patent: Apr. 13, 2021

(54) OPTICAL NETWORK UNIT COMPLIANCE DETECTION

(71) Applicant: Nokia Technologies OY, Espoo (FI)

(72) Inventors: Joseph Smith, Fuquay-Varina, NC (US); Roy Tebbe, Raleigh, NC (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/801,678

(22) Filed: Feb. 26, 2020

Related U.S. Application Data (60) Provisional application No. 62/913,908, filed on Oct. 11, 2019.

(51) Int. Cl.
*H04B 10/00* (2013.01)
*H04B 10/079* (2013.01)

(52) U.S. Cl.
CPC ... *H04B 10/0793* (2013.01); *H04B 10/07955* (2013.01)

(58) Field of Classification Search
USPC ...................................................... 398/66–73
See application file for complete search history.

(56) References Cited

U.S. PATENT DOCUMENTS

| | | | | |
|---|---|---|---|---|
| 5,535,038 A * | 7/1996 | Hinch | .................... | H04B 10/69 372/38.07 |
| 6,229,631 B1 * | 5/2001 | Sato | .................. | H04B 10/0775 398/30 |
| 6,748,169 B1 * | 6/2004 | Geiger | ................. | H04B 10/077 398/25 |
| 7,187,861 B2 * | 3/2007 | Ruchet | ................. | H04B 10/079 356/73.1 |
| 7,254,325 B2 * | 8/2007 | Hoshida | ............... | H04B 10/077 398/25 |
| 8,364,043 B2 * | 1/2013 | Lee | ..................... | H04B 10/2587 398/160 |
| 8,571,058 B2 * | 10/2013 | Sone | .................. | H04Q 11/0067 370/437 |
| 8,644,711 B2 * | 2/2014 | Kim | .................... | H04J 14/0282 398/137 |
| 9,806,807 B1 * | 10/2017 | Sandstrom | ............. | H04B 10/25 |
| 9,831,948 B2 * | 11/2017 | Ruchet | ................. | H04B 10/079 |
| 2002/0027688 A1 * | 3/2002 | Stephenson | .......... | H04B 10/504 398/139 |
| 2002/0114562 A1 * | 8/2002 | Bigo | ....................... | H04J 14/06 385/24 |
| 2007/0237520 A1 * | 10/2007 | DeLew | ............. | H04B 10/0799 398/17 |

(Continued)

*Primary Examiner* — Agustin Bello
(74) *Attorney, Agent, or Firm* — Harness, Dickey & Pierce, P.L.C.

(57) ABSTRACT

An optical line terminal receives a sequence of optical power test transmissions from an optical network unit, wherein the sequence of optical power test transmissions includes a first plurality of consecutive optical transmissions, a second plurality of consecutive optical transmissions, and a third plurality of consecutive optical transmissions. The optical line terminal decides whether the optical network unit is malfunctioning based on an extinction ratio and an average transmit power, wherein the extinction ratio is based on the first plurality of consecutive optical transmissions and the second plurality of consecutive optical transmissions, and the average transmit power is based on the third plurality of consecutive optical transmissions.

20 Claims, 4 Drawing Sheets

(56) References Cited

U.S. PATENT DOCUMENTS

| | | | |
|---|---|---|---|
| 2007/0237523 A1* | 10/2007 | Miguel | H04J 3/14 398/71 |
| 2008/0187314 A1* | 8/2008 | Chung | H04J 14/0246 398/72 |
| 2011/0141457 A1* | 6/2011 | Levin | G01M 11/3127 356/73.1 |
| 2015/0180570 A1* | 6/2015 | Malouin | H04B 10/0795 398/25 |
| 2016/0134079 A1* | 5/2016 | Liao | H01S 5/0687 398/38 |
| 2016/0134365 A1* | 5/2016 | Cheng | H04B 10/07955 398/38 |
| 2017/0201320 A1* | 7/2017 | Prause | H04B 10/27 |
| 2020/0296487 A1* | 9/2020 | Bonk | H04B 10/07955 |

* cited by examiner

OPTICAL NETWORK UNIT COMPLIANCE DETECTION

CROSS-REFERENCE TO RELATED APPLICATION(S)

This application claims priority under 35 U.S.C. § 119 to U.S. Provisional Application No. 62/913,908, filed on Oct. 11, 2019, the entire contents of which are incorporated herein by reference.

TECHNICAL FIELD

One or more example embodiments relate to passive optical networks (PONs).

BACKGROUND

A passive optical network (PON) is a type of fiber-optic access network. A PON may include an optical line terminal (OLT) at a central office (CO) and a number of optical network units (ONUs), also known as optical network terminals (ONTs), located at or near subscribers' premises (e.g., home, office building, etc.)

During operation of a PON, a continuous data stream may be transmitted downstream from the OLT to various ones of the ONUs, or transmitted upstream as bursts of data from various ones of the ONUs to the OLT.

SUMMARY

The scope of protection sought for various example embodiments is set out by the independent claims. The example embodiments and features, if any, described in this specification that do not fall under the scope of the independent claims are to be interpreted as examples useful for understanding various example embodiments described herein.

At least one example embodiment provides a method of determining whether an optical network unit is malfunctioning, the method comprising: receiving, at an optical line terminal, a sequence of optical power test transmissions from the optical network unit, the sequence of optical power test transmissions including a first plurality of consecutive optical transmissions indicative of a first logic value during a first time interval, a second plurality of consecutive optical transmissions indicative of a second logic value during a second time interval, and a third plurality of consecutive optical transmissions indicative of alternating first and second logic values during a third time interval, the second time interval being subsequent to the first time interval; determining, at the optical line terminal, an extinction ratio for the optical network unit based on the first plurality of consecutive optical transmissions and the second plurality of consecutive optical transmissions; determining, at the optical line terminal, an average transmit power for the optical network unit based on the third plurality of consecutive optical transmissions during a third time interval; and deciding, at the optical line terminal, whether the optical network unit is malfunctioning based on the extinction ratio and the average transmit power.

At least one other example embodiment provides a non-transitory computer-readable storage medium storing computer-readable instructions that, when executed by at least one processor, cause an optical line terminal to perform a method of determining whether an optical network unit is malfunctioning, the method comprising: receiving a sequence of optical power test transmissions from the optical network unit, the sequence of optical power test transmissions including a first plurality of consecutive optical transmissions indicative of a first logic value during a first time interval, a second plurality of consecutive optical transmissions indicative of a second logic value during a second time interval, and a third plurality of consecutive optical transmissions indicative of alternating first and second logic values during a third time interval, the second time interval being subsequent to the first time interval; determining an extinction ratio for the optical network unit based on the first plurality of consecutive optical transmissions and the second plurality of consecutive optical transmissions; determining an average transmit power for the optical network unit based on the third plurality of consecutive optical transmissions during a third time interval; and deciding whether the optical network unit is malfunctioning based on the extinction ratio and the average transmit power.

According to at least some example embodiments, the method may further include transmitting a power test command from the optical line terminal to the optical network unit to initiate transmission of the sequence of optical power test transmissions.

According to one or more example embodiments, the method may further include: computing, at the optical line terminal, an optical modulation amplitude for the optical network unit based on the extinction ratio and the average transmit power; and wherein the deciding decides whether the optical network unit is malfunctioning based on the optical modulation amplitude.

The deciding may include deciding whether the optical network unit is malfunctioning based on whether the optical modulation amplitude is between a minimum threshold value and a maximum threshold value.

According to at least some example embodiments, the first time interval may be temporally spaced apart from the second time interval by a fourth time interval; and the method further includes receiving a NO POWER transmission at the optical line terminal during the fourth time interval.

The third plurality of consecutive optical transmissions may be subsequent to the second plurality of consecutive optical transmissions; the third plurality of consecutive optical transmissions may be temporally spaced apart from the second plurality of consecutive optical transmissions by a fourth time interval; and the method may further include receiving a NO POWER transmission at the optical line terminal during the fourth time interval.

The third plurality of consecutive optical transmissions may be prior to the first plurality of consecutive optical transmissions; the third plurality of consecutive optical transmissions may be temporally spaced apart from the first plurality of consecutive optical transmissions by a fourth time interval; and the method may further include receiving a NO POWER transmission at the optical line terminal during the fourth time interval.

At least one other example embodiment provides an optical line terminal comprising at least one processor and at least one memory including computer program code. The at least one memory and the computer program code are configured to, with the at least one processor, cause the optical line terminal to: receive a sequence of optical power test transmissions from an optical network unit, the sequence of optical power test transmissions including a first plurality of consecutive optical transmissions indicative of a first logic value during a first time interval, a second plurality of consecutive optical transmissions indicative of a second logic value during a second time interval, and a third plurality of consecutive optical transmissions indicative of alternating first and second logic values during a third time interval, the second time interval being subsequent to the first time interval; determine an extinction ratio for the optical network unit based on the first plurality of consecutive optical transmissions and the second plurality of consecutive optical transmissions; determine an average transmit power for the optical network unit based on the third plurality of consecutive optical transmissions during a third time interval; and decide whether the optical network unit is malfunctioning based on the extinction ratio and the average transmit power.

According to one or more example embodiments, the at least one memory and the computer program code may be configured to, with the at least one processor, cause the optical line terminal to transmit a power test command to the optical network unit to initiate transmission of the sequence of optical power test transmissions at the optical network unit.

The at least one memory and the computer program code may be configured to, with the at least one processor, cause the optical line terminal to: compute an optical modulation amplitude for the optical network unit based on the extinction ratio and the average transmit power, and decide whether the optical network unit is malfunctioning based on the optical modulation amplitude.

The at least one memory and the computer program code may be configured to, with the at least one processor, cause the optical line terminal to decide whether the optical network unit is malfunctioning based on whether the optical modulation amplitude is between a minimum threshold value and a maximum threshold value.

The first time interval may be temporally spaced apart from the second time interval by a fourth time interval; and the at least one memory and the computer program code may be configured to, with the at least one processor, cause the optical line terminal to receive a NO POWER transmission at the optical line terminal during the fourth time interval.

The third plurality of consecutive optical transmissions may be subsequent to the second plurality of consecutive optical transmissions; the third plurality of consecutive optical transmissions may be temporally spaced apart from the second plurality of consecutive optical transmissions by a fourth time interval; and the at least one memory and the computer program code may be configured to, with the at least one processor, cause the optical line terminal to receive a NO POWER transmission at the optical line terminal during the fourth time interval.

The third plurality of consecutive optical transmissions may be prior to the first plurality of consecutive optical transmissions; the third plurality of consecutive optical transmissions may be temporally spaced apart from the first plurality of consecutive optical transmissions by a fourth time interval; and the at least one memory and the computer program code may be configured to, with the at least one processor, cause the optical line terminal to receive a NO POWER transmission at the optical line terminal during the fourth time interval.

At least one other example embodiment provides an optical line terminal comprising: means for receiving a sequence of optical power test transmissions from an optical network unit, the sequence of optical power test transmissions including a first plurality of consecutive optical transmissions indicative of a first logic value during a first time interval, a second plurality of consecutive optical transmissions indicative of a second logic value during a second time interval, and a third plurality of consecutive optical transmissions indicative of alternating first and second logic values during a third time interval, the second time interval being subsequent to the first time interval; means for determining an extinction ratio for the optical network unit based on the first plurality of consecutive optical transmissions and the second plurality of consecutive optical transmissions; means for determining an average transmit power for the optical network unit based on the third plurality of consecutive optical transmissions during a third time interval; and means for deciding whether the optical network unit is malfunctioning based on the extinction ratio and the average transmit power.

According to at least some example embodiments, the optical line terminal may further include means for transmitting a power test command to the optical network unit to initiate transmission of the sequence of optical power test transmissions.

According to one or more example embodiments, the optical line terminal may further include: means for computing an optical modulation amplitude for the optical network unit based on the extinction ratio and the average transmit power; and wherein the means for deciding decides whether the optical network unit is malfunctioning based on the optical modulation amplitude.

The means for deciding may include means for deciding whether the optical network unit is malfunctioning based on whether the optical modulation amplitude is between a minimum threshold value and a maximum threshold value.

According to at least some example embodiments, the first time interval may be temporally spaced apart from the second time interval by a fourth time interval; and the optical line terminal may further include means for receiving a NO POWER transmission at the optical line terminal during the fourth time interval.

The third plurality of consecutive optical transmissions may be subsequent to the second plurality of consecutive optical transmissions; the third plurality of consecutive optical transmissions may be temporally spaced apart from the second plurality of consecutive optical transmissions by a fourth time interval; and the optical line terminal may further include means for receiving a NO POWER transmission at the optical line terminal during the fourth time interval.

The third plurality of consecutive optical transmissions may be prior to the first plurality of consecutive optical transmissions; the third plurality of consecutive optical transmissions may be temporally spaced apart from the first plurality of consecutive optical transmissions by a fourth time interval; and the optical line terminal may further include means for receiving a NO POWER transmission at the optical line terminal during the fourth time interval.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

While one or more example embodiments may be described from the perspective of an optical line terminal (OLT) or optical network unit (ONU) (also referred to as an optical network terminal (ONT)), it should be understood that one or more example embodiments discussed herein may be performed by one or more components (e.g., one or more processors or processing circuitry, transceivers, etc.) at the applicable device or apparatus. For example, according to one or more example embodiments, at least one memory may include or store computer program code, and the at least one memory and the computer program code may be configured to, with at least one processor, cause the OLT or ONU to perform the operations discussed herein.

It will be appreciated that a number of example embodiments may be used in combination.

One or more example embodiments provide mechanisms for detecting compliance, or identifying malfunction, of ONUs in a passive optical network (PON) based on an extinction ratio (ER) and a measured average transmit power of the ONU.

In at least one example embodiment, an OLT at the central office may determine the extinction ratio and transmission power without having a technician local at the ONU. If an ONU is identified as non-compliant or malfunctioning, then the central office may perform troubleshooting techniques, tag the ONU for follow up action, restart the ONU or disable the ONU (e.g., take the ONU out-of-service).

According to at least some example embodiments, a modified ranging scheme for the PON may be used such that ranging "slots" or time intervals allow the OLT to perform (e.g., direct) optical measurement of optical transmission power of a test transmission sequence (also referred to as a sequence of optical power test transmissions or sequence of test transmission patterns) from the ONU.

In at least one example embodiment, the OLT may send a "special" message (power test or PowerTest command) to the ONU to initiate the test transmission sequence. In at least one example, the power test message may be sent in response to a suspected issue identified at the ONU (e.g., a non-compliant bit error rate (BER) on that ONU). Alternatively, the test transmission sequence may be self-initiated at the ONU or initiated by a network operator (or technician) at the ONU. In one example, the test transmission sequence may include:

A first optical transmission pattern including a first plurality of consecutive optical transmissions indicative of a first logic value (e.g., ALL 1's) during a time interval of length 'x';

A 'NO POWER' (blank) transmission during a time interval of length 'a' after expiration of the time interval of length 'x';

A second optical transmission pattern including a second plurality of consecutive optical transmissions indicative of a second logic value (e.g., ALL 0's) for a time interval of length 'y' after expiration of the time interval of length 'a';

A 'NO POWER' (blank) transmission during a time interval of length 'b' after expiration of the time interval of length 'y';

A third optical transmission pattern including a third plurality of consecutive optical transmissions indicative of alternating first and second logic values (e.g., nominal 50% data-stream, such as a pseudo-random bit sequence (PRBS), 101010 . . . , etc.) during a time interval of length 'z' after expiration of the time interval of length 'a'; and A 'NO POWER' (blank) transmission during a time interval of length 'c' time after expiration of the time interval of length 'z'.

According to one or more example embodiments, the values of x, y, z, a, b, and c may be the same or different from one another. In one example, each of the values of x, y, z, a, b, or c may be less than or equal to about 1 second (e.g., between about 1 millisecond (ms) and about 10 ms). At least the values of each of x, y and z may be greater than the length of the Preamble transmission during normal operation.

Although discussed herein with regard to a 'NO POWER' transmission between the respective optical transmission patterns, example embodiments should not be limited to this example. As an alternative, for example, the OLT and ONU may have knowledge of the length of the respective time intervals during which an optical transmission pattern is to be transmitted, and the 'NO POWER' transmission may be omitted. For example, the length of each respective time interval may be known a priori at the ONU and the OLT, or indicated in the power test message from the OLT.

Figure 1:
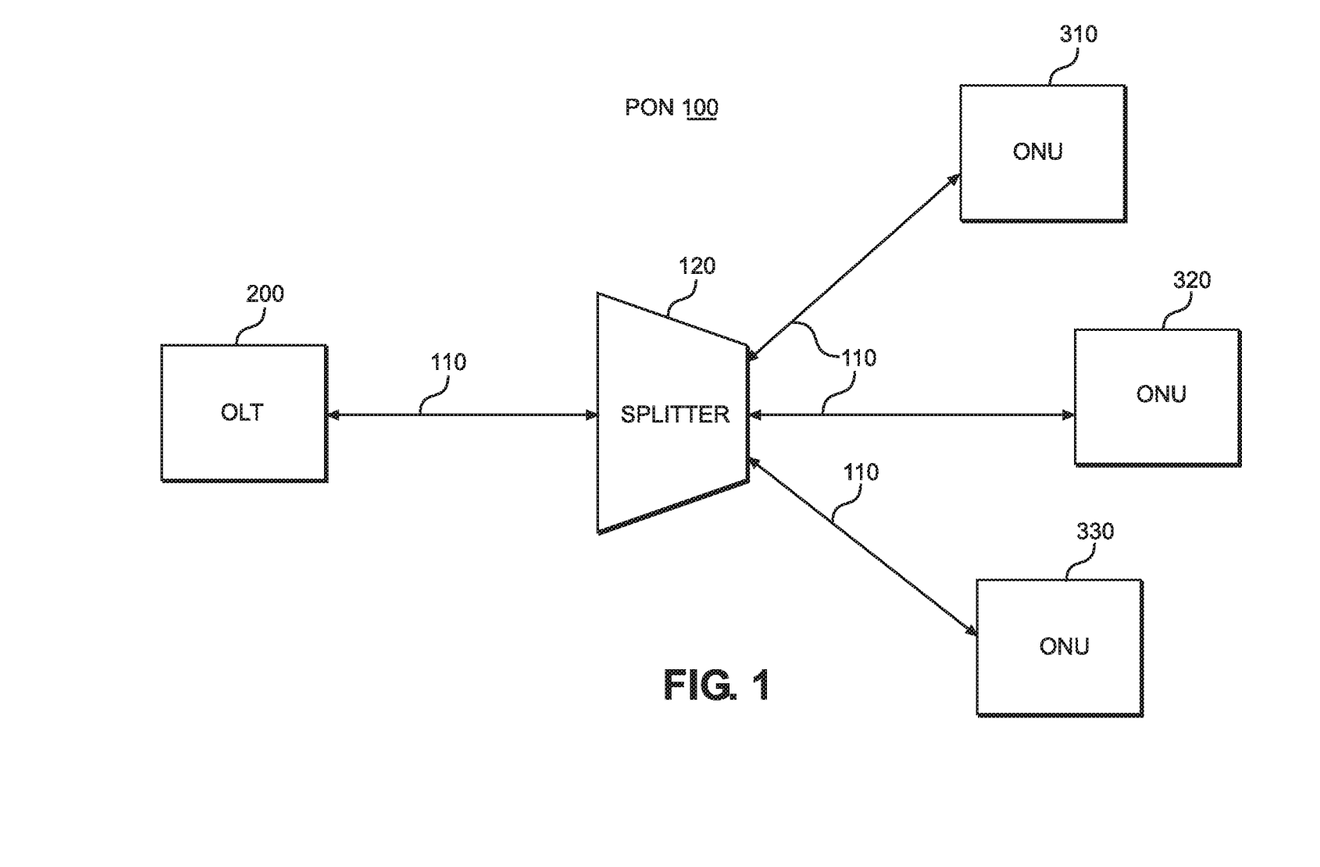
FIG. 1 is a block diagram illustrating an example Passive Optical Network (PON).

FIG. 1 is a block diagram illustrating an example PON.

Referring to FIG. 1, the PON 100 includes an OLT 200, a plurality of ONUs 310, 320, 330 and a passive splitter 120. The elements of the PON 100 shown in FIG. 1 are connected via several fiber optic cables 110. Although only a single OLT 200, a single splitter 120 and three ONUs 310, 320, 330 are shown in FIG. 1, example embodiments should not be limited to this example.

In operation, the OLT 200 transmits a continuous data stream downstream to one or more of the ONUs 310, 320, 330, and one or more of the ONUs 310, 320, 330 transmits bursts of data upstream to the OLT 200. The splitter 120 is configured to split signals from the OLT 200 to the ONUs 310, 320, 330.

An example embodiment of each of the OLT 200 and the ONU 310 will be discussed in more detail below with regard to FIGS. 2 and 3, respectively. Although only an example embodiment of the ONU 310 will be discussed herein, it should be understood that each of ONUs 320 and 330 shown in FIG. 1 may be the same or substantially the same as the ONU 310 shown in FIG. 3.

Figure 2:
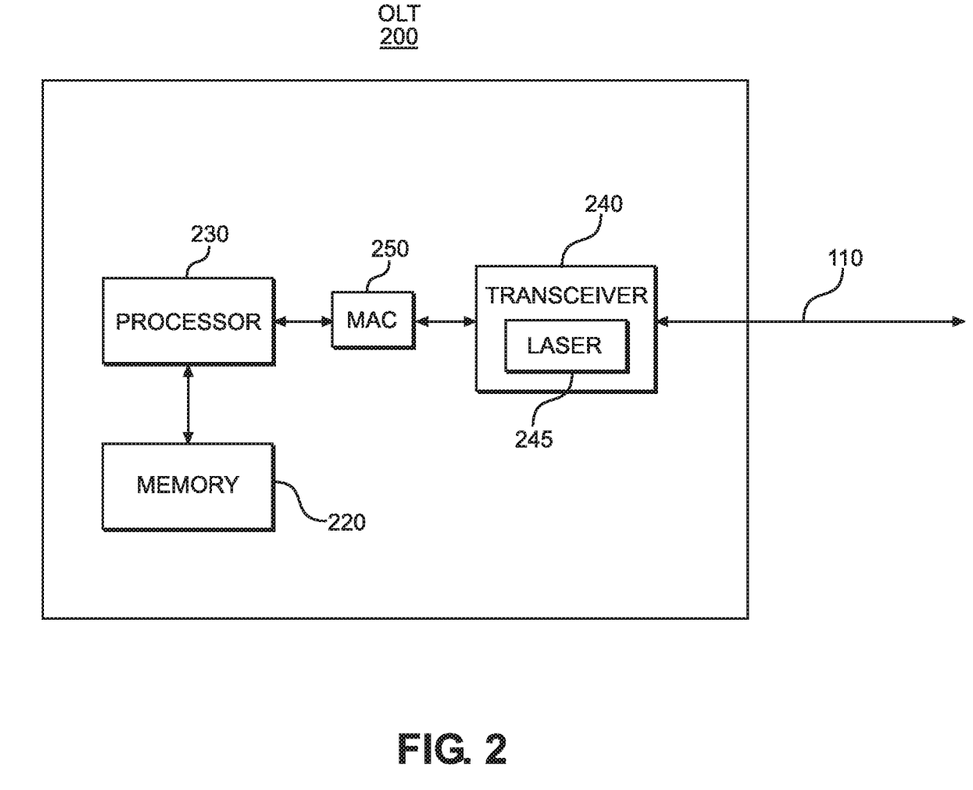
FIG. 2 is a block diagram illustrating an Optical Line Terminal (OLT) according to example embodiments.

FIG. 2 is a block diagram illustrating an example embodiment of the OLT 200.

Referring to FIG. 2, the OLT 200 includes a memory 220, a processor 230, a transceiver 240 and a media access controller (MAC) 250. The memory 220 stores computer readable instructions for operating the OLT 200. The memory 220 also stores one or more of information to be sent from the OLT 200, information received from one or more ONUs, parameter values (e.g., transmit power, average transmit power, extinction ratio, Optical Modulation Amplitude (OMA), or the like) measured or computed at the OLT 200, or a maximum and minimum OMA threshold value. The maximum and minimum OMA threshold values may be stored in the form of the following line entry in a lookup table. According to one or more example embodiments, the maximum and minimum OMA threshold values may be determined via empirical study and set by a network operator.

OLT: RSSI: $OMA_{MIN}$(dBm), $OMA_{MAX}$(dBm)

In one example, $OMA_{MIN}$ may be about −24.2 dBm and $OMA_{MAX}$ may be about −5.0 dBm.

The processor 230 controls the OLT 200, including the memory 220, the MAC 250 and the transceiver 240, based on instructions stored in the memory 220. The processor 230 may also function as a counter to track, identify expiration of, time intervals as will be discussed in more detail later.

The transceiver 240 transmits and receives information via the fiber optic cable 110 to and from one or more of the ONUs 310, 320, 330 via the splitter 120. As shown in FIG. 2, the transceiver 240 includes a laser 245 to transmit information over the fiber optic cable 110. The MAC 250 may (directly) control the transceiver 240 based on instruction from the processor 230.

In at least one example embodiment, the transceiver 240 may be, or include, an OLT optical transceiver module (e.g., having an optical detector) configured to, among other things, perform CW signal measurement on the receiver path.

A more detailed discussion of example functionality of the OLT 200 according to example embodiments will be provided later with regard to FIG. 4.

Figure 3:
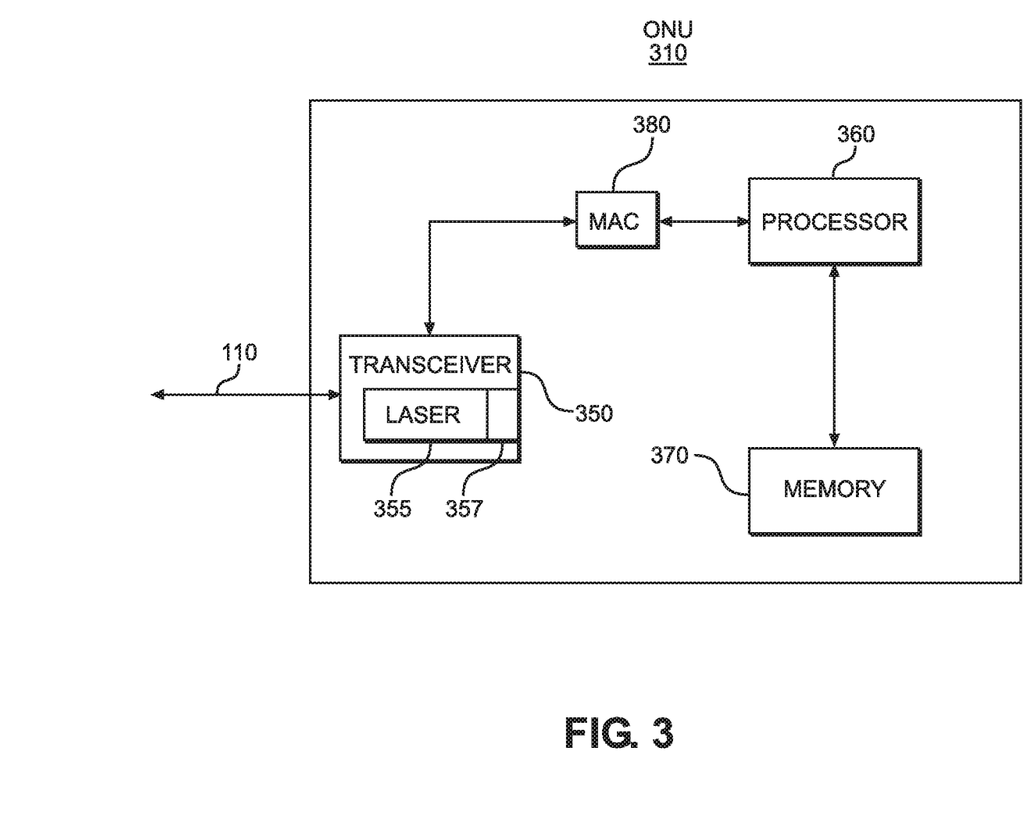
FIG. 3 is a block diagram illustrating an Optical Network Unit (ONU) according to example embodiments.

FIG. 3 is a block diagram illustrating an example embodiment of the ONU 310. As mentioned above, although only a detailed discussion of ONU 310 is provided, each of ONUs 320 and 330 shown in FIG. 1 may be the same or substantially the same as the ONU 310 shown in FIG. 3.

Referring to FIG. 3, the ONU 310 includes a memory 370, a processor 360, a MAC 380, and a transceiver 350.

The memory 370 stores computer readable instructions for operating the ONU 310. The memory 370 may also store one or more of information to be sent from the ONU 310, information received from the OLT 200, parameter values (e.g., transmit power, average transmit power, extinction ratio, OMA, or the like) measured or computed at the ONU 310, or the maximum and minimum OMA threshold value. The maximum and minimum OMA threshold values may be stored in the form of a line of entry in a lookup table in the same or substantially the same manner as discussed above with regard to FIG. 2.

The processor 360 controls the ONU 310, including the memory 370, the MAC 380, and the transceiver 350, based on the instructions stored in the memory 370. The processor 360 may also function as a counter to track, and identify expiration of, time intervals as will be discussed in more detail later.

The transceiver 350 transmits and receives information via the fiber optic cable 110 to and from the OLT 200. As shown in FIG. 3, the transceiver 350 includes a laser 355 to transmit information over the fiber optic cable 110. The MAC 380 (directly) controls the transceiver 350 based on instruction from the processor 360.

The laser 355 may optionally have a laser power control circuit 357 that controls the power output of the laser.

In at least one example embodiment, the transceiver 350 may be, or include, an OLT optical transceiver module (e.g., having an optical detector) configured to, among other things, perform CW signal measurement on the receiver path.

A more detailed discussion of example functionality of the ONU 310 will be provided below with regard to FIG. 4.

Figure 4:
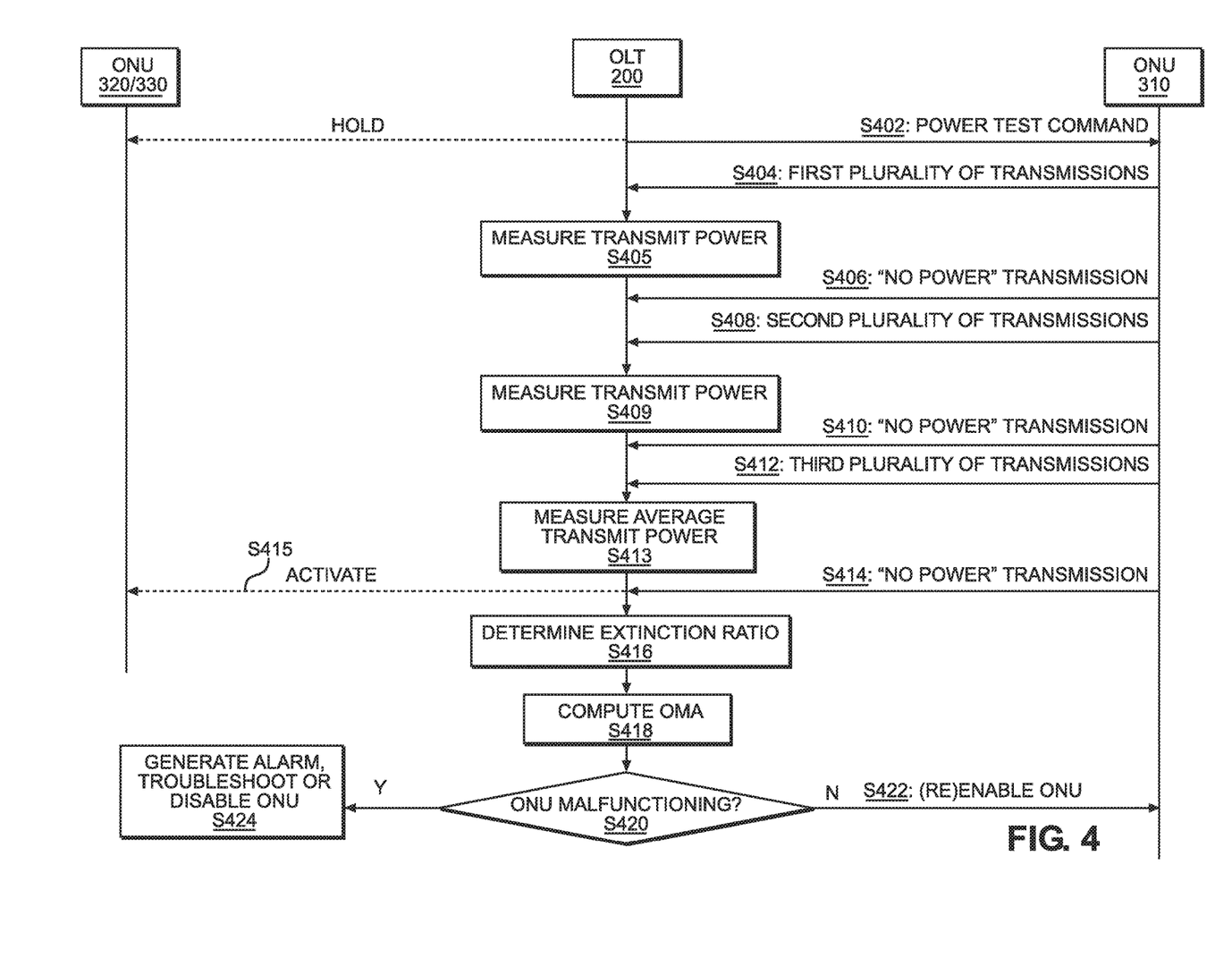
FIG. 4 is a hybrid signal flow diagram and flow chart illustrating a method according to example embodiments.

FIG. 4 is a hybrid signal flow diagram and flow chart illustrating a method according to example embodiments. For example purposes, the example embodiment shown in FIG. 4 will be discussed primarily with regard to the OLT 200 and the ONU 310. Additionally, the example embodiment shown in FIG. 4 will be described for example purposes with regard to a specific sequence of transmission patterns (e.g., ALL 1's, then ALL 0's, then a nominal 50% data-stream, such as pseudo-random bit sequence (PRBS), 101010 . . . ). However, example embodiments should not be limited to this example. Rather, the sequence of transmission patterns may have any order or sequence as long as the sequence or order is known or agreed upon between the OLT 200 and ONU 310. In one example, the ONU 310 and OLT 200 may have a priori knowledge of the order of the transmission patterns. In another example, the OLT 200 may indicate an order of the transmission patterns to the ONU 310 in the power test command.

Referring to FIG. 4, at step S402, the OLT 200 sends a power test command to the ONU 310 to initiate the sequence of optical power test transmissions (test transmission sequence) by the ONU 310. In an example test scenario, the OLT 200 may send the power test command to the ONU 310 according to a schedule (e.g., periodically), or upon a ranging request due to installation of the ONU 310 on the PON. In other examples, the sending of the power test command by the OLT 200 may be initiated in response to detection of a fault or other issue (e.g., non-compliant BER) at the ONU 310 or be initiated autonomously by an operator at the central office. As mentioned above, the power test command may also indicate the order of the sequence of transmission patterns to be sent to the OLT 200 by the ONU 310.

Also at step S402, the OLT 200 temporarily stops upstream transmission of all other ONUs (e.g., 320 and 330) for at least the duration of the sequence of test transmission patterns by the ONU 310. In one example, the OLT 200 puts the ONUs 320 and 330 on hold by not providing the ONUs with permission to talk or transmit for the duration of the sequence of test transmission patterns. As a result, the ONUs 320 and 330 remain substantially quiet. In another example, as shown in FIG. 4, the OLT 200 may send a hold or out-of-service (OOS) command to the ONUs 320 and 330 to temporarily put the ONUs in an OOS state.

In response to the power test command, at step S404 the ONU 310 sends the first test transmission pattern in the sequence of test transmission patterns to the OLT 200 during a first time interval of length 'x'. In at least one example, the ONU 310 transmits a first plurality of consecutive optical transmissions indicative of a first logic value (e.g., ALL 1's) during the time interval of length 'x'.

At step S405, the OLT 200 measures the transmit power $P_{ALL\_1s}$ of the first plurality of consecutive optical transmissions transmitted by the ONU 310 during the time interval of length 'x'. According to one or more example embodiments, the first plurality of consecutive optical transmissions are transmitted by the ONU 310 using a signal similar to traffic such that the OLT 200 may obtain a transmit power reading in Continuous Wave (CW) operating mode within the time interval of length 'x'. The OLT 200 stores the measured transmit power PALL $_{ALL\_1s}$ in, for example, the memory 220.

Upon determining that the time interval of length 'x' has expired, at step S406 the ONU 310 sends a first 'NO POWER' (blank) transmission to the OLT 200 during a time interval of length 'a' to indicate that the time interval of length 'x' has ended. This 'NO POWER' transmission may also indicate that a second test transmission pattern will be transmitted by the ONU 310 at the end of the interval of length 'a'.

Upon expiration of the time interval of length 'a', at step S408 the ONU 310 sends the second test transmission pattern in the sequence of test transmission patterns to the OLT 200 during a time interval of length 'y'. In more detail, for example, the ONU 310 transmits a second plurality of consecutive optical transmissions indicative of a second logic value (e.g., ALL 0's) during the time interval of length 'y'.

At step S409, the OLT 200 measures the transmit power $P_{ALL\_0s}$ of the second plurality of consecutive optical transmissions transmitted by the ONU 310 during the time interval of length 'y'. According to one or more example embodiments, the second plurality of consecutive optical transmissions are transmitted by the ONU 310 using a signal similar to traffic such that the OLT 200 may obtain a transmit power reading in CW operating mode within the time interval of length 'y'. The OLT 200 stores the measured transmit power $P_{ALL\_0s}$ in, for example, the memory 220.

Upon expiration of the time interval of length 'y', at step S410 the ONU 310 sends a second 'NO POWER' transmission to the OLT 200 during a time interval of length 'b' to indicate that the time interval of length 'y' has ended. This 'NO POWER' transmission may also indicate that a third test transmission pattern will be transmitted by the ONU 310 at the end of the interval of length 'b'.

Upon expiration of the time interval of length 'b', at step S412 the ONU 310 sends the third test transmission pattern in the sequence of test transmission patterns to the OLT 200 during a time interval of length 'z'. In at least one example, the ONU 310 transmits a third plurality of consecutive optical transmissions indicative of alternating first and second logic values (e.g., nominal 50% data-stream, such as PRBS, 101010 . . . ) during the time interval of length 'z'.

At step S413, the OLT 200 measures the average transmit power $P_{AVG}$ for the ONU 310 based on the third plurality of consecutive optical transmissions transmitted by the ONU 310 during the time interval of length 'z'. As with the first and second plurality of consecutive optical transmissions, the third plurality of consecutive optical transmissions are transmitted by the ONU 310 using a signal similar to traffic such that the OLT 200 may obtain a transmit power reading in CW operating mode within the time interval of length 'z'. The OLT 200 stores the measured average transmit power $P_{AVG}$ in, for example, the memory 220.

More generally, the operation at step S413 may be characterized as determining the average transmit power for the ONU 310 based on the third plurality of consecutive optical transmissions during the time interval of length 'z'.

Upon expiration of the time interval of length 'z', at step S414 the ONU 310 sends a third 'NO POWER' transmission to the OLT 200 during a time interval of length 'c' to indicate that the time interval of length 'z' has ended.

If the ONUs 320 and 330 were put in an OOS state at step S402, then at step S415 the OLT 200 may output a command to put the ONUs 320 and 330 back in service (re-enable or re-activate) in response to receiving the 'NO POWER' transmission at step S414.

Still referring to FIG. 4, at step S416 the OLT 200 determines the extinction ratio $r_e$ for the ONU 310 based on the stored transmit power $P_{ALL\_1s}$ for the first plurality of consecutive optical transmissions and the stored transmit power $P_{ALL\_0s}$ for the second plurality of consecutive optical transmissions. More specifically, for example, the OLT 200 may compute the extinction ratio $r_e$ for the ONU 310 according to Equation 1 shown below.

$$r_e = \frac{P_{ALL\_1s}}{P_{ALL\_0s}} \quad\quad \text{[Equation 1]}$$

The OLT 200 stores the computed extinction ratio $r_e$ in the memory 220.

More generally, the operation at step S416 may be characterized as determining the extinction ratio for the ONU 310 based on the first plurality of consecutive optical transmissions and the second plurality of consecutive optical transmissions.

At step S418, the OLT 200 computes an optical modulation amplitude (OMA) for the ONU 310 based on the extinction ratio $r_e$ obtained at step S416 and the average transmit power $P_{AVG}$ measured at step S413. The OMA is a mathematical relationship of average (or mean) output power and extinction ratio. In one example, the OLT 200 may compute the OMA based on the extinction ratio $r_e$ and the average transmit power $P_{AVG}$ according to Equation 2 shown below.

$$OMA = 2P_{AVG}\frac{r_e - 1}{r_e + 1} \quad\quad \text{[Equation 2]}$$

At step S420, the OLT 200 determines whether the ONU 310 may be malfunctioning (or non-compliant) based on the OMA computed at step S418 and the maximum and minimum OMA threshold values ($OMA_{MIN}$ and $OMA_{MAX}$) stored in the memory 220. According to at least one example embodiment, the OLT 200 determines whether the ONU 310 may be malfunctioning by determining (e.g., through comparison) whether the computed OMA value is within the range between the minimum OMA threshold value $OMA_{MIN}$ and the maximum OMA threshold value $OMA_{MAX}$.

If the computed OMA value is less than the minimum OMA threshold value $OMA_{MIN}$ or greater than the maximum OMA threshold value $OMA_{MAX}$, then the OLT 200 determines that the ONU 310 may be malfunctioning. On the other hand, if the computed OMA value is within the range between the minimum OMA threshold value $OMA_{MIN}$ and the maximum OMA threshold value $OMA_{MAX}$, then the ONU 310 is determined not to be malfunctioning at least from the perspective of optical power transmissions.

According to one or more example embodiments, malfunctioning of the ONU 310 may refer to a physical failure or malfunction, or a situation in which the ONU 310 is non-compliant (e.g., fails to comply with one or more of a standardized average power, OMA threshold values or a specialized pass/fail criteria specified by a network operator or other user).

If the OLT 200 determines that the ONU 310 is malfunctioning at step S420, then at step S424 the OLT 200, central office or a network operator may perform at least one of generating an alarm, troubleshooting or disabling the ONU 310. In one example, the OLT 200 may generate an alarm towards the craft user interface or OSS. If the malfunction (or non-compliance) of the ONU 310 is causing issues with other ONUs on the PON, then the OLT 200 may also take the ONU 310 out of service (disable the ONU) by sending an OOS command to the ONU 310. A technician may then be dispatched to the location of the ONU 310 to repair or replace the ONU 310.

In another example, if the malfunction of the ONU 310 is not actually causing issues with other ONUs on the PON, then the ONU 310 may be tagged (e.g., by the OLT 200, central office or a network operator) for future replacement.

In still another example, in response to detecting the malfunction, the OLT 200 may troubleshoot the problem by initiating, tagging the ONU 310 for, a remote restart at a convenient or designated time.

Returning to step S420, if the OLT 200 determines that the ONU 310 is not malfunctioning, then the OLT 200 enables (or re-enables) the ONU 310 for use on the PON. The OLT 200 may enable or re-enable the ONU 310 by sending a command to put the ONU 310 back in service.

Although the example embodiment shown in FIG. 4 includes 'NO POWER' transmissions between the respective test transmission patterns, example embodiments should not be limited to this example. As an alternative, for example, the OLT 200 and ONU 310 may have knowledge of the length of the respective time intervals (e.g., through exchange of message(s) such as the power test command) during which test transmission pattern is transmitted, and the 'NO POWER' transmissions may be omitted.

In the example embodiment shown in FIG. 4, the OLT 200 transmits a power test command to initiate the sequence of test transmissions by the ONU 310. However, example embodiments should not be limited to this example. According to at least one other example embodiment, the ONU 310 may self-initiate the power test sequence (e.g., by automatically sending a power test or other command upstream to the OLT 200) or an operator may cause the ONU 310 to initiate the power test sequence. In one example, the power test sequence may be initiated (e.g., by the ONU 310 or by an operator) upon being installed on the PON.

Transmit power measurements in accordance with one or more example embodiments may provide improved accuracy relative to normal Received Signal Strength Indicator (RSSI) methods and the ability to calculate the needed extinction ratio. By utilizing CW signals during the respective time intervals ("slots"), more accurate measurements may be possible at the OLT. For example, transmitting ALL 1's for a time interval of length 'x' may allow the average power to be higher (e.g., substantially higher) than the typical RSSI timeslot allotment.

It is noted that improved accuracy may also be provided by having the operator manually initiate a specific power test command, which may allow for longer intervals to transmit respective transmission patterns to increase accuracy. As this would be a commanded test rather than a regularly cycle test, the impact on upstream bandwidth may be reduced and/or minimized, for example, if run at off-peak times.

Regular testing by using some sort of 1/N of an ONUs ranging time interval N may provide nearly constant monitoring of both extinction ratio and optical power for OMA derived measurement compliance, albeit with lower accuracy than the longer commanded test. It may, however, still be an improvement over the conventional RSSI schema at the cost of some delay in new ONU's being able to range on the PON and perhaps slightly upstream bandwidth impact depending on actual implementation.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing OLTs, ONUs, ONTs, computers, central offices, or the like. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause an OLT, ONU, ONT, or the like to perform the necessary tasks. Additionally, the processor, memory, transceiver, MAC, etc., and example algorithms encoded as computer program code, may serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, OLTs, ONUs, ONTs, computers, central offices, or the like may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims. Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

Reference is made in detail to embodiments, examples of which are illustrated in the accompanying drawings, wherein like reference numerals refer to the like elements throughout. In this regard, the example embodiments may have different forms and should not be construed as being limited to the descriptions set forth herein. Accordingly, the example embodiments are merely described below, by referring to the figures, to explain example embodiments of the present description. Aspects of various embodiments are specified in the claims.

What is claimed is:

1. A method of determining whether an optical network unit is malfunctioning, the method comprising:
   receiving, at an optical line terminal, a sequence of optical power test transmissions from the optical network unit, the sequence of optical power test transmissions including a first plurality of consecutive optical transmissions indicative of a first logic value during a first time interval, a second plurality of consecutive optical transmissions indicative of a second logic value during a second time interval, and a third plurality of consecutive optical transmissions indicative of alternating first and second logic values during a third time interval, the second time interval being subsequent to the first time interval;

determining, at the optical line terminal, an extinction ratio for the optical network unit based on the first plurality of consecutive optical transmissions and the second plurality of consecutive optical transmissions;

determining, at the optical line terminal, an average transmit power for the optical network unit based on the third plurality of consecutive optical transmissions during a third time interval; and deciding, at the optical line terminal, whether the optical network unit is malfunctioning based on the extinction ratio and the average transmit power.

2. The method of claim 1, further comprising:
transmitting a power test command from the optical line terminal to the optical network unit to initiate transmission of the sequence of optical power test transmissions.

3. The method of claim 1, further comprising:
computing, at the optical line terminal, an optical modulation amplitude for the optical network unit based on the extinction ratio and the average transmit power; and wherein
the deciding decides whether the optical network unit is malfunctioning based on the optical modulation amplitude.

4. The method of claim 3, wherein the deciding comprises:
deciding whether the optical network unit is malfunctioning based on whether the optical modulation amplitude is between a minimum threshold value and a maximum threshold value.

5. The method of claim 1, wherein
the first time interval is temporally spaced apart from the second time interval by a fourth time interval; and
the method further includes receiving a NO POWER transmission at the optical line terminal during the fourth time interval.

6. The method of claim 1, wherein
the third plurality of consecutive optical transmissions are subsequent to the second plurality of consecutive optical transmissions;
the third plurality of consecutive optical transmissions are temporally spaced apart from the second plurality of consecutive optical transmissions by a fourth time interval; and
the method further includes receiving a NO POWER transmission at the optical line terminal during the fourth time interval.

7. The method of claim 1, wherein
the third plurality of consecutive optical transmissions are prior to the first plurality of consecutive optical transmissions;
the third plurality of consecutive optical transmissions are temporally spaced apart from the first plurality of consecutive optical transmissions by a fourth time interval; and
the method further includes receiving a NO POWER transmission at the optical line terminal during the fourth time interval.

8. An optical line terminal comprising:
at least one processor; and
at least one memory including computer program code, the at least one memory and the computer program code configured to, with the at least one processor, cause the optical line terminal to receive a sequence of optical power test transmissions from an optical network unit, the sequence of optical power test transmissions including a first plurality of consecutive optical transmissions indicative of a first logic value during a first time interval, a second plurality of consecutive optical transmissions indicative of a second logic value during a second time interval, and a third plurality of consecutive optical transmissions indicative of alternating first and second logic values during a third time interval, the second time interval being subsequent to the first time interval, determine an extinction ratio for the optical network unit based on the first plurality of consecutive optical transmissions and the second plurality of consecutive optical transmissions, determine an average transmit power for the optical network unit based on the third plurality of consecutive optical transmissions during a third time interval, and decide whether the optical network unit is malfunctioning based on the extinction ratio and the average transmit power.

9. The optical line terminal of claim 8, wherein the at least one memory and the computer program code are configured to, with the at least one processor, cause the optical line terminal to transmit a power test command to the optical network unit to initiate transmission of the sequence of optical power test transmissions at the optical network unit.

10. The optical line terminal of claim 8, wherein the at least one memory and the computer program code are configured to, with the at least one processor, cause the optical line terminal to
compute an optical modulation amplitude for the optical network unit based on the extinction ratio and the average transmit power, and
decide whether the optical network unit is malfunctioning based on the optical modulation amplitude.

11. The optical line terminal of claim 10, wherein the at least one memory and the computer program code are configured to, with the at least one processor, cause the optical line terminal to decide whether the optical network unit is malfunctioning based on whether the optical modulation amplitude is between a minimum threshold value and a maximum threshold value.

12. The optical line terminal of claim 8, wherein
the first time interval is temporally spaced apart from the second time interval by a fourth time interval; and
the at least one memory and the computer program code are configured to, with the at least one processor, cause the optical line terminal to receive a NO POWER transmission at the optical line terminal during the fourth time interval.

13. The optical line terminal of claim 8, wherein
the third plurality of consecutive optical transmissions are subsequent to the second plurality of consecutive optical transmissions;
the third plurality of consecutive optical transmissions are temporally spaced apart from the second plurality of consecutive optical transmissions by a fourth time interval; and
the at least one memory and the computer program code are configured to, with the at least one processor, cause the optical line terminal to receive a NO POWER transmission at the optical line terminal during the fourth time interval.

14. The optical line terminal of claim 8, wherein
the third plurality of consecutive optical transmissions are prior to the first plurality of consecutive optical transmissions;
the third plurality of consecutive optical transmissions are temporally spaced apart from the first plurality of consecutive optical transmissions by a fourth time interval; and
the at least one memory and the computer program code are configured to, with the at least one processor, cause the optical line terminal to receive a NO POWER transmission at the optical line terminal during the fourth time interval.

15. A non-transitory computer-readable storage medium storing computer-readable instructions that, when executed by at least one processor, cause an optical line terminal to perform a method of determining whether an optical network unit is malfunctioning, the method comprising:
receiving a sequence of optical power test transmissions from the optical network unit, the sequence of optical power test transmissions including a first plurality of consecutive optical transmissions indicative of a first logic value during a first time interval, a second plurality of consecutive optical transmissions indicative of a second logic value during a second time interval, and a third plurality of consecutive optical transmissions indicative of alternating first and second logic values during a third time interval, the second time interval being subsequent to the first time interval;
determining an extinction ratio for the optical network unit based on the first plurality of consecutive optical transmissions and the second plurality of consecutive optical transmissions;
determining an average transmit power for the optical network unit based on the third plurality of consecutive optical transmissions during a third time interval; and
deciding whether the optical network unit is malfunctioning based on the extinction ratio and the average transmit power.

16. The non-transitory computer-readable storage medium of claim 15, wherein the method further comprises:
transmitting a power test command from the optical line terminal to the optical network unit to initiate transmission of the sequence of optical power test transmissions.

17. The non-transitory computer-readable storage medium of claim 15, wherein the method further comprises:
computing, at the optical line terminal, an optical modulation amplitude for the optical network unit based on the extinction ratio and the average transmit power; and wherein
the deciding decides whether the optical network unit is malfunctioning based on whether the optical modulation amplitude is between a minimum threshold value and a maximum threshold value.

18. The non-transitory computer-readable storage medium of claim 15, wherein
the first time interval is temporally spaced apart from the second time interval by a fourth time interval; and
the method further includes receiving a NO POWER transmission at the optical line terminal during the fourth time interval.

19. The non-transitory computer-readable storage medium of claim 15, wherein
the third plurality of consecutive optical transmissions are subsequent to the second plurality of consecutive optical transmissions;
the third plurality of consecutive optical transmissions are temporally spaced apart from the second plurality of consecutive optical transmissions by a fourth time interval; and
the method further includes receiving a NO POWER transmission at the optical line terminal during the fourth time interval.

20. The non-transitory computer-readable storage medium of claim 15, wherein
the third plurality of consecutive optical transmissions are prior to the first plurality of consecutive optical transmissions;
the third plurality of consecutive optical transmissions are temporally spaced apart from the first plurality of consecutive optical transmissions by a fourth time interval; and
the method further includes receiving a NO POWER transmission at the optical line terminal during the fourth time interval.

* * * * *